United States Patent [19]

Brownawell

[11] Patent Number: 5,225,081
[45] Date of Patent: Jul. 6, 1993

[54] METHOD FOR REMOVING POLYNUCLEAR AROMATICS FROM USED LUBRICATING OILS

[75] Inventor: Darrell W. Brownawell, Scotch Plains, N.J.

[73] Assignee: Exxon Research and Engineering Co., Florham Park, N.J.

[21] Appl. No.: 720,968

[22] Filed: Jun. 25, 1991

Related U.S. Application Data

[63] Continuation-in-part of Ser. No. 404,154, Sep. 7, 1989, Pat. No. 5,069,799.

[51] Int. Cl.$^5$ .............................. B01D 37/00
[52] U.S. Cl. .................. 210/690; 123/196 A; 208/182; 208/183; 210/749; 210/805; 210/806; 210/168; 210/909
[58] Field of Search .............. 123/196 A; 210/690, 210/749, 805, 806, 168, 314, 315, 209, 335, 338, 416.5, 909, 506; 208/182, 183

[56] References Cited

U.S. PATENT DOCUMENTS

| | | | |
|---|---|---|---|
| 1,914,999 | 6/1933 | Maverick et al. | 208/183 |
| 2,529,719 | 9/1970 | Graybill | 208/182 |
| 4,075,098 | 2/1978 | Paul et al. | 210/168 |
| 4,501,660 | 2/1985 | Hebert | 210/209 |
| 4,557,829 | 12/1985 | Fields | 210/315 |
| 4,664,683 | 5/1987 | Degen et al. | 210/506 |
| 4,751,901 | 6/1988 | Moor | 123/196 A |
| 4,977,871 | 12/1990 | Brownawell et al. | 123/196 A |
| 5,019,311 | 5/1991 | Koslow | 210/503 |
| 5,069,799 | 12/1991 | Brownawell et al. | 210/749 |

FOREIGN PATENT DOCUMENTS

| | | |
|---|---|---|
| 282840 | 12/1986 | Fed. Rep. of Germany. |
| 507064 | 6/1939 | United Kingdom. |
| 836993 | 6/1965 | United Kingdom. |

*Primary Examiner*—Peter Hruskoci
*Attorney, Agent, or Firm*—John W. Ditsler

[57] ABSTRACT

Used lubricating oils can be rejuvenated by passing the oil through a filter system comprising a hollow solid composite that contains a thermoplastic binder and an active filter media of a chemically active filter media, a physically active filter media, or mixtures thereof. In a preferred embodiment, the composite is formed by forcing a substantially uniform mixture of thermoplastic binder particles, active filter media particles, solvent 600 Neutral base oil, and sodium stearate through an extrusion die of substantially uniform cross-section, wherein the mixture is subjected to heat, pressure, and cooling to consolidate the mixture so that it emerges from the die as a hollow solid composite. Most preferably, the composite will surround an inactive filter media located within the filter system.

16 Claims, 3 Drawing Sheets

METHOD FOR REMOVING POLYNUCLEAR AROMATICS FROM USED LUBRICATING OILS

CROSS-REFERENCE TO RELATED APPLICATIONS

This application is a continuation-in-part of U.S. Ser. No. 404,154 filed Sep. 7, 1989, now U.S. Pat. No. 5,069,799.

BACKGROUND OF THE INVENTION

1. Field of the Invention

This invention concerns a filter system and its use to rejuvenate used lubricating oils.

2. Description of Related Art

The use of both single and two-stage filters for treating lubricating oils is known (see, for example, U.S. Pat. Nos. 2,302,552; 3,390,778; 3,489,676; 3,749,247; 4,886,599; and 4,977,787, and British Patents 507,065 and 836,993; the disclosures all of which are incorporated herein by reference).

However, none of these patents disclose the particular filter system and method described hereinafter.

SUMMARY OF THE INVENTION

This invention concerns a replaceable filter system and its use to rejuvenate used lubricating oils. More specifically, used lubricating oils can be rejuvenated by passing the oil through a hollow solid composite comprising a thermoplastic binder and an active filter media that contains a chemically active filter media, a physically active filter media, or a mixture thereof. By "rejuvenate" is meant that a chemical property, a physical property, or both of a used lubricating oil is improved so that the oil is at least partially restored to the quality of a fresh or unused lubricating oil. In a preferred embodiment, the filter system will also contain an inactive filter media.

DETAILED DESCRIPTION OF THE INVENTION

The filter system and method of this invention require an active filter media that contains a chemically active filter media, a physically active filter media, or a combination thereof, wherein the active filter media is in the form of a hollow solid composite formed from the active filter media and a thermoplastic binder.

By "chemically active filter media" is meant a filter media that chemically interacts with the used lubricating oil (e.g., by chemical adsorption, acid/base neutralization, and the like) By "physically active filter media" is meant a filter media that interacts with the lubricating oil by other than chemical interaction (e.g., by physical adsorption).

The chemically active filter media will be (or will contain) a chemically active ingredient or ingredients, which may be supported on a substrate or be unsupported. If supported, suitable substrates include alumina, activated clay, cellulose, cement binder, silica-alumina, activated carbon, and the like. Typically, high surface substrates such as alumina, cement binder, and activated carbon are preferred. The substrate may be in various shapes such as pellets, cylinders, or spheres. The substrate may (but need not) be inert.

One example of a chemically active filter media is a filter media that is (or contains) an oil insoluble, or substantially oil insoluble, strong base. Suitable strong bases include, but are not limited to, barium oxide (BaO), calcium carbonate ($CaCO_3$), calcium oxide (CaO), calcium hydroxide ($Ca(OH)_2$), magnesium carbonate ($MgCO_3$), magnesium hydroxide ($Mg(OH)_2$), magnesium oxide (MgO), sodium aluminate ($NaAlO_2$), sodium carbonate ($Na_2CO_3$), sodium hydroxide (NaOH), zinc oxide (ZnO), or their mixtures. If calcium oxide or calcium hydroxide is used, each should be placed on a support to avoid forming a slime bed, which would result in an undesirably high pressure drop across the chemically active filter media. Preferred strong bases are magnesium oxide, sodium hydroxide, zinc oxide, or mixtures thereof, with magnesium oxide being particularly preferred. A chemically active filter media containing a strong base can be used in several applications. For example, the strong base may be used to remove soot from a lubricating oil by contacting the soot (which has an acidic surface) with the base (see European Patent Application No. 90309735.0, having a Publication No. of 0 416 907). In this application, "strong base" means a base that will cause the soot to become immobilized as deposits on the chemically active filter media. As another example, a chemically active filter media containing a strong base can be used to displace a weak base from soluble neutral salts formed by reacting combustion acids with a soluble weak base in the oil (see U.S. Pat. No. 4,906,389, the disclosure of which is incorporated herein by reference). In this patent, "weak base" refers to a base that has a PKa of from about 4 to about 12, and "strong base" refers to a base that will displace the weak base from the neutral salts and return the weak base to the oil. Once the weak base has been displaced from the soluble neutral salts, the remaining strong base/combustion acid salts will be immobilized as deposits on the filter media.

The physically active filter media includes the same substrates suitable for use with the chemically active filter media as well as other substrates such as attapulgus clay, dolomite clay, and molecular sieves. An example of a physically active filter media is a media (such as activated carbon) that can remove polynuclear aromatics (PNAs) from used lubricating oil, especially PNAs with at least three (preferably 4, 5, and 6) aromatic rings (as is disclosed in U.S. Pat. No. 4,977,787).

Figure 1:
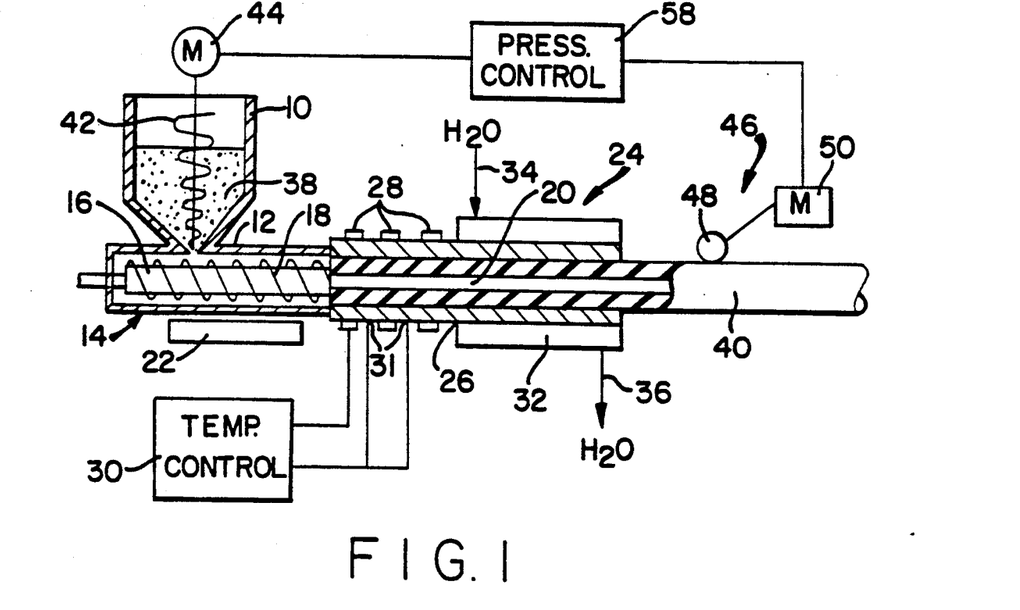
FIG. 1 is an elevational view, in partial cross-section, of an extrusion apparatus for forming the hollow solid composite used in the filter system of this invention.

The hollow solid composite of chemically active or physically active filter media may be formed by various techniques (e.g. molding). However, a preferred method is described in copending application U.S. Ser. No. 682,182 filed Apr. 8, 1991 in the name of Evan E. Koslow. This method is illustrated in FIG. 1, which shows a feed bin 10 containing a substantially uniform feed mixture 38. This mixture is in the form of a thoroughly mixed powder or granular material comprising a thermoplastic binder and a powdered or granular active filter media such as, for example, activated carbon. In a preferred embodiment, a base oil and a metal stearate should also be present in uniform feed mixture 38 to form composites that are suitable for use in the present filter system. The substantially uniform feed mixture will have been prepared in a suitable mixer (not shown) such as, for example, a plow mixer or ball mixer, as described hereinafter. The feed bin 10 feeds into an extruder barrel 12, which contains a feed screw 14 comprising a solid core 16 surrounded by conventional helical flights 18. A center rod 20 is attached to, and extends forward axially of, the core 16. A preheater 22 may be employed to preheat the feed mixture 38 in the extruder barrel 12. The extruder used may be a standard design used for conventional plastics extrusion, but will generally have a typical length to width ratio of 10:1 and be equipped with a bimetallic barrel liner to protect against highly abrasive powder or particles. The barrel 12 is designed to withstand high pressure as may be experienced during an unanticipated excursion in operating pressure. The motor used to drive the extruder screw 14 is typically a D.C. motor capable of 10 to 20 horsepower that is coupled to a 30-50:1 gear box.

The output end of the extruder barrel 12 feeds the input end of a die assembly 24. The die assembly 24 comprises an elongated die 26 which is characterized by an inside shape of substantially uniform cross-section throughout, which cross-section is not substantially smaller than the cross-section of the inside diameter (ID) of the extruder barrel 12. The input end of the die 26 is provided with heating elements 28 under the control of a temperature control unit 30 responsive to thermocouples 31. The output end of the die 26 is cooled by a cooling fluid jacket 32 having a cooling fluid inlet 34 and outlet 36, the cooling fluid preferably being water. The die 26 is smooth so as to create a minimum of friction with the feed mixture passing through the die in order to prevent shearing of the product from ID to outside diameter (OD) during consolidation and formation of solid composite.

The feed bin 10 is filled with a substantially uniform mixture of a powder or granular material 38 comprising particles of a relatively low softening temperature thermoplastic binder such as, for example, polyethylene, and particles of a higher softening temperature active filter media such as, for example, activated carbon. The feed mixture is passed through the extruder barrel 12 by the feed screw 14. The use of a feed screw is especially critical to obtaining an accurate and reproducible flow of powdered mixture, which in selected cases, such as for example feed mixtures containing very small carbon powder particles, will not feed through the extruder without the assistance of a vertical feed screw or auger 42 in feed bin 10. However, an auger 42 is not required for all feed mixtures since many mixtures may be fed to the extruder barrel 12 from feed bin 10 by gravity flow. The mixture in the extruder is preheated by the action of preheater 22. The preheated mixture then passes into the die 26 where it is further heated by the heating elements 28 to the required processing temperature, which is substantially above the softening temperature of the binder but below that of the active filter media (typical readings for thermocouples 31 are between about 360° and about 400° F.). Pressure is applied to the feed mixture in the die 26 while it is simultaneously being heated, such that the mixture will coalesce into a solid mass around the center rod 20. The solid mass is immediately cooled by the passage of cooling fluid, e.g. water (typically 90°-120° F.), through the cooling jacket 32. The final solid composite 40, in the form of a hollow cylinder, is then extruded from the die assembly 24.

A crucial feature of this extrusion process is the control of pressure within the die 26 by means external to the die. These means comprise a back pressure device 46 that impedes extrusion of the solid composite 40 from the die 26 and, optionally, can also comprise an auger 42 in feed bin 10 under control of a motor 44 which forces the feed mixture 38 into the extruder barrel 12. In the illustration of FIG. 1, the back pressure device 46 comprises a pair of rollers 48 driven by a motor 50 in the same direction as the flow of composite 40 from die assembly 24 and at a rate equal to the desired rate of extrusion to provide the desired back pressure. The pressure within the die 26 does not normally exceed about 400 psi and is usually less than about 200 psi. In some instances, it may even be as low as 5-10 psi to produce an acceptable solid composite.

Figure 2:
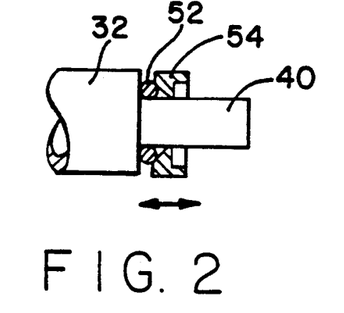
FIG. 2 is an enlarged detail of a modified back pressuring apparatus for the apparatus of FIG. 1.

A number of other devices may be used for controllably adjusting the back pressure externally of the extrusion die 26. One such device is illustrated in FIG. 2 as an annular rubber "doughnut" 52 which encircles the hollow solid composite cylinder 40 and is compressed against it such as by a controllable annular compression disc 54. In any event, the key to this extrusion process is that the pressures and temperatures are controlled from outside the die. As a result, the die itself can be very simple, with typically no change in internal cross-section.

Figure 4:
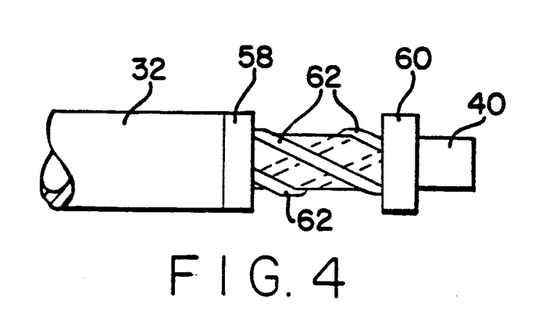
FIG. 4 is an enlarged detail of another modified back pressuring apparatus for the apparatus of FIG. 1.

Another back pressuring device is illustrated in FIG. 4 as a series of helical rubber coils 62 which encircle the composite cylinder 40 and is controllably squeezed or compressed against the composite 40 by relative annular movement of anchoring plates 58 and 60. Coils 62 are typically silicone rubber tubing, with the opposite ends of each tube being connected to annular anchor plates 58 and 60. Anchor plate 58 is suitably attached to the cooling end 32 of die 26 in any suitable fixed manner while anchor plate 60 is free to be suitable rotated around composite 40. A typical device will generally comprise three or four such coils 62. Rotation of anchor plate 60 permits annular movement of coils 62 to increase or decrease the pressure of the coils upon composite 40, thereby permitting ready adjustment of back pressure by increasing or decreasing the helix angle of coils 62.

It is important that the feed mixture 38 entering the die 26 remain flowable. For that reason, the preheating which occurs within the extruder barrel 12 should not closely approach the softening point of the thermoplastic binder. However, preheating is useful because it reduces the amount of additional heat that must be supplied within the die 26. This makes it possible to use a shorter die and to speed-up the process.

Another feature of this extrusion process is that the cross-sectional area of the die 26 cannot be substantially smaller than the free cross-sectional area of the feed screw 14. The term "free cross-sectional area" refers to the area (or volume) of feed mixture as defined by the space between the core 16 and the flights 18 of the extruder screw 14, corrected for the thickness of the flights themselves. As an example, it might be possible, in the case of activated carbon, to reduce the area from 4.6 square inches at the extruder outlet to 4.2 square inches at the die inlet. However, this can only be done with difficulty because there would be a tendency for the material to solidify or "freeze". However, there is no difficulty in expanding from the extruder into a larger cross-section die.

Figure 3:
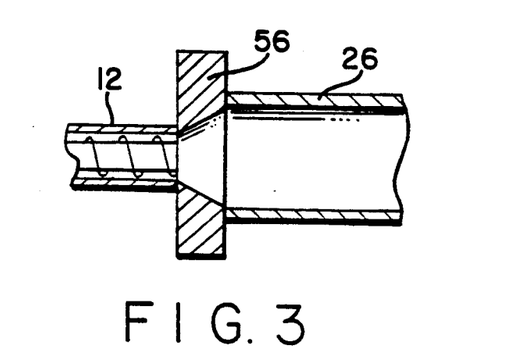
FIG. 3 is an enlarged cross-section of an expansion zone for materials injected into the die for the apparatus of FIG. 1.

Such an expansion is illustrated in FIG. 3 wherein the extruder barrel 12 feeds into an oversized die 26 via an expansion flange 56. Obviously, forcing expansion of materials into the die 26 requires back pressure, which is supplied by the back pressure device 46. As previously explained, the type of back pressure device that can be used is virtually unlimited. It may be a pair of rollers as shown in FIG. 1 controlled by a stepper motor or a D.C. brushless motor through a controller 58 or a rubber doughnut 52 as explained with respect to FIG. 2. Virtually anything may be employed as long as it provides controlled back pressure. In the case of certain activated carbon particles in the feed mixture, this back pressure can be very low, and need be, for example, only 5 or 10 pounds per square inch. On the other hand, it may be necessary to apply very high back pressures when producing very high density products. The back pressure required depends upon the composition of the composite being produced. If too much pressure is applied, many substances, even in an absolutely smooth straight die, will undergo irreversible solidification and densification to the point where the die will actually split and explode. Thus, there is, for each composite composition, an "operating window", which is defined by three factors:

1. Maximum density or back pressure—each feed mixture used to produce a solid composite has a maximum density and allowed pressure, after which the mixture will not emerge from even a smooth continuous cross-section die. Each formulation also requires a minimum back pressure to consolidate the mixture into a strong cohesive composite structure.

2. Minimum and maximum heating—if a substance is heated insufficiently, it will not solidify and will be very prone to "locking" within the extruder die. Similarly, if overheated, a substance will also have a strong tendency to "lock" within the die.

3. Dimensions of the heating section—the dimensions of the heating section of the die are critical. If the heating section is too short and the flow of material too fast, the heat required to form a solid composite cannot be transmitted and the composite may not solidify. On the other hand, if the heating section is too long, the back pressure increases uncontrollably so that the composite is irreversibly locked-up to the extruder wall. Furthermore, the cooling section must be long enough that the solid composite produced is cooled sufficiently to retain its structural integrity when it emerges from the die without contributing uncontrolled amounts of back pressure that can lead to lock-up.

An additional factor to be considered in defining the "operating window" relates to particle size and crush resistance of the active filter media as well as the character and lubricity of the feed mixture. If the particle size is relatively large, the back pressure is applied against a relatively small number of particle interfaces, which will cause particle crushing. In other words, the larger the particle size, the lower the permitted pressure. Furthermore, the size and type of particles have a strong influence upon the thermal conductivity of the mixture and the thermal conductivity changes as the mixture is consolidated and densified.

Other factors to be considered in defining the "operating window" are the extrusion rate, the heating and cooling rate, the dimensions of the extruder screw and the extrusion die, and the intrinsic back pressure in the die due to the L:G ratio.

In the case of carbon, it is known that if the die length is too long, substantial intrinsic back pressure and consequent crushing of the carbon will result. For this reason, a longer die can be used for powdered carbon than for coarse granular carbon. The important factor is not the absolute length, but the L:G ratio, i.e. the ratio of die length L to die gap G wherein the gap is defined as (OD-ID)/2 where OD is the outside diameter of the article being produced (i.e. the inside diameter of the die) and ID is the inside diameter of the article being produced (i.e. the outside diameter of center rod 20). For example, with $80 \times 325$ mesh carbon, dies can be employed having L:G ratios of about 25 to 30. In the case of $20 \times 50$ mesh carbon, L:G ratios of about 20 to 25 are optimal. These are well polished die walls and center rods.

As previously explained, there are distinct limitations on the ability to compress the feed mixture into a die smaller than the extruder. However, if that were to be attempted, the compression change should occur just at the tip of the extruder's screw. In addition, the ratio of the cross-sectional area of the die mouth to the extruder output area should not be less than approximately 0.9.

The extrusion process thus described involves applying heat into, and thereafter sufficient pressure and shear upon, a substantially uniform mixture of a thermoplastic binder in the form of relatively low softening point solid resin particles, and the active filter media described above. The sizes of the binder particles should be within the range of about 0.1 to about 250 micrometers, and are typically from about 5 to about 20 micrometers, while the sizes of the active filter media particles should be within the range of from about 0.1 to about 3,000 micrometers.

The binder and active filter media particles should be very thoroughly mixed together. This is important to insure that the binder is sufficiently evenly distributed throughout the active filter media particles so that during the extrusion process, the binder will entrap or bond to substantially all of the active filter media.

After mixing, heat is applied, preferably in the absence of any significant pressure or shear, to raise the temperature of the substantially uniform feed mixture to substantially above the softening point of the binder, preferably at least about 25° C. above the softening point of the binder, but below the softening temperature of the active filter media. Sufficient pressure and at least some finite amount of shear are then applied to the heated mixture for a short period of time to cause forced point-bonding. The mixture is then rapidly cooled to a temperature below the softening point of the binder, causing the binder phase to be frozen in form.

The binder can be composed of nearly any thermoplastic material including, for example, polyolefins such as polyethylene, polypropylene, polybutene-1, and poly-4-methylpentene-1; polyvinyls such as polyvinyl chloride, polyvinyl fluoride, and polyvinylidene chloride; polyvinyl esters such as polyvinyl acetate, polyvinyl propionate, and polyvinyl pyrrolidone; polyvinyl ethers, polyvinyl sulfates; polyvinyl phosphates; polyvinyl amines; polyoxidiazoles; polytriazols; polycarbodiimides; copolymers and block interpolymers such as ethylene-vinyl acetate copolymers; polysulfones; polycarbonates; polyethers such as polyethylene oxide, polymethylene oxide, and polypropylene oxide; polyarylene oxides; polyesters, including polyarylates such as polyethylene terphthalate, polyimides, and variations on these and other polymers having substituted groups such as hydroxyl, halogen, lower alkyl groups, lower alkoxy groups, monocyclic aryl groups, and the like, and other thermoplastic meltable solid materials. Preferred binders are nylon, polypropylene, polysulfones, or mixtures thereof. Nylon is an especially preferred binder, with Nylon 11 (available from Atochem North America) being most preferred.

In addition to the chemically active (C) and physically active (P) filter media described previously, suitable active filter media particles include silica gel (P), acrylic powders and fibers (C), glass beads (P), common minerals such as silica (P), ion-exchange resins (C), ceramics (P), zeolites (P and C), diatomaceous earth (P and C), polyester particles and fibers (P), and particles of engineering resins such as polycarbonate (P).

One of the requirements for the production of strong and uniform structures using this process is the formation of a stable, substantially uniform feed mixture of binder and active filter media particles prior to extrusion. In general, the methods used to produce this uniform mixture and the characteristics of the particles used in the process must be such as to produce a mixture in which the binder particles form a stable attachment to the active filter media particles. This attachment stabilizes the active filter media particles, which otherwise would normally segregate as a result of differences in density or particle morphology. Preferably, the binder has a slight inherent tackiness. However, artificial tackiness can be created by adding a tackifier to the mixture.

In general, binder particles produced by emulsion polymerization are superior in performance to particles produced by other methods. For example, particles of polyethylene resins produced by emulsion polymerization are effective in the extrusion process, but particles produced by grinding are usually not effective. However, nylon of suitable particle size can be obtained by grinding.

The formation of stable substantially uniform feed mixtures under the conditions of high intensity mixing and surface treatment described herein allows mixtures of particles to be handled that usually undergo severe separation or segregation because of differences in density, particle morphology, or size. For example, stable mixtures can be produced between particles having densities that differ by more than a factor of ten. Smooth spherical particles can be mixed with particles having a fibrous or substantially nonspherical character. Particles whose size varies by a factor of 1,000 can be mixed and maintained as stable mixtures.

Similarly, low-shear mixing, such as within a ribbon blender or conventional ball mill, is insufficient to produce a stable mixture of binder and active filter media particles within a reasonable period of time. Without the production of a specific structure during mixing, the process is generally ineffective such that cohesive and strong products cannot be produced. Not only must the binder particle or active filter media particle have specific characteristics, such as those produced by the presence of surface active agents, but mixing must be sufficiently violent to produce a condition where binder particles and active filter media particles have formed stable attachments. These "prebonds" are sufficient to produce microaggregates that substantially alter the flow and dusting characteristics of the particles within the mixture. Violent mixing is also required to separate aggregates (which are often quite stable) of the binder particles that may form and to force reattachment of the binder particles to the active filter media particles.

Correct methods of mixing produce a feed mixture composed of microaggregates of active filter media particles and binder particles. These aggregates have a reduced tendency to release dust when handled. An experienced operator can also readily notice a reduction in the flow characteristics of the powder mixture that indicates the formation of the desired bonds between particles. Samples smeared on a black surface show no residual binder aggregates which would be indicated by the presence of small white streaks.

Poor mixing or use of binder or active filter media particles lacking the ability to form stable "prebonds", results in mixtures in which binder and active filter media particles separate, or where active filter media particles of widely varying density or morphology separate because stable aggregates have not been formed. These stable aggregates, formed during mixing, allow this process to bond particles that cannot normally be maintained in a stable mixture. It appears that, as a rule, the process is generally not workable with a poorly mixed feed mixture or with a feed mixture in which the binder particles have not become attached to the active filter media particles during the mixing step.

Adequate mixing can be accomplished if a ball mill is modified to have one or more (usually two) sets of steel rods placed along its periphery. The balls rotating within the mill are lifted by one set of steel rods and allowed to drop down upon the powder that has accumulated upon the surface of a second set of steel rods. The rods work well when they are threaded such that the powder is smashed between the threads of the rods and the falling balls. This action substantially amplifies the violence of the ball mill's action and within a short period of time (usually less than three hours) produces the required microaggregated mixture.

To economically mix larger volumes of the feed mixture, a conventional ribbon blender can be modified to use a series of high shear plows that press and shear over a period of time. High loading rates are required to obtain good mixing in such systems and partial loads of powder can often not be mixed effectively.

The resulting mixture, once all particles and components have been substantially uniformly dispersed, is then ready for extrusion.

The extrusion can be carried out in a modified conventional screw extruder capable of providing high working pressures of up to about 6,000–20,000 psi (421.86–1406.2 kg/cm$^2$).

The extruder is normally modified to operate a smaller diameter screw within a barrel normally sized for a larger screw, e.g. operating a 2.5 inch (6.4 cm) screw within the thick barrel designed to withstand high pressures that may occur. The screw will generally have an auger-like design. The barrel of the extruder is modified to operate at ambient room temperature or to provide mild preheating up to about 170° F. (78° C.) or less and the powder is transported through the barrel at a temperature below the softening point of the binder resin. Heat resulting from friction within the barrel can, if desired, be removed by the circulation of a coolant through both the screw and barrel.

The die used for the extrusion of the feed mixture has two sections. In the first section, the walls of the die are intensely heated to heat the feed mixture of binder and active filter media to a temperature substantially above (generally at least about 25° C. above) the softening temperature of the binder material in the mixture but to a temperature less than the softening temperature of the active filter media in the mixture. The mixture consolidates into the desired shape of the elements being formed. If desired, the heating zone can be formed into two or more heating zones of different temperatures. The temperature is usually between about 25° to about 100° C. above the binder's melting point. As the feed mixture leaves the extruder screw and enters the die 26, a back pressure device 46 provides suitable back pressure, as determined by the factors constituting the operating window, to cause the material to consolidate in the die. At the beginning of the extrusion process it may be necessary to employ a plug at the exit of the die to force the powder to consolidate. Thereafter, the back pressure device 46 provides the necessary back pressure for consolidation of the material and forming of the hollow solid composite.

In the second die section, the formed product is intensively cooled and the cooled, shaped, extruded product emerges from this section of the die. Cooling of the immobilized shape must be accomplished rapidly and immediately.

The die design and operating conditions must be adjusted exactingly to obtain a solid composite with the desired final density which, in the case of activated carbon filters, is generally within the range of 0.57 to 0.85 gm/cm$^3$. However, it is usually possible to maintain density within a narrow $\pm 0.005$ gm/cm$^3$ window, once conditions are suitably adjusted. The uniformity of the composite is therefore better than that obtained by any other known process.

The operating conditions chosen for extruding a hollow solid cylinder of activated carbon in a forced point-bonded structure having an outside diameter of 3.50 inches (8.9 cm) and an inside diameter of 2.75 inches (7.0 cm) must meet all of the following criteria:

1. Heating rate must be balanced to obtain complete heating of the carbon during its passage through the die and to consolidate the powder to the core of the extruded profile;

2. Cooling rate in the cooling section of the die must be sufficient to harden the composite prior to its emergence from the die;

3. The back pressure means for providing suitable back pressure in the die serves to consolidate the exterior surface of the carbon cylinder and provide a uniform, smooth, and low attrition surface to the cylinder. The back pressure employed is that required to obtain the desired density.

The shaped composite that emerges from the extruder die follows the tolerances of the die very closely and, when processing very fine powders, the exterior walls of the product can be very smooth, as defined by the surface of the die. The resulting extruded product is normally composed of a material similar to extremely hard rubber or brittle ceramic and can usually be easily cut to length with a knife or shear, especially if the cutting surface is heated.

Using an active filter media in the form of a hollow solid composite minimizes and substantially eliminates the tendency of a loosely packed filter media to settle and form internal channels that result in poor contact of the oil with the filter media. A filter containing active filter media in the form of a composite is also easier to assemble than when the filter media is loosely packed discrete particles.

For removing PNAs from used lubricating oil, activated carbon is the preferred active filter media and nylon is the preferred thermoplastic binder. The carbon particles used should have the following characteristics:

a length to diameter (L/D) ratio that (1) prevents excessive carbon particle breakage during the extrusion process with consequent formation of non-bonded carbon fines and (2) ensures the structural integrity of the composite. Typically, the L/D ratio will be 4 or less, and preferably 2 or less, a BET surface area of at least 600 m$^2$/gm, preferably at least 800 m$^2$/g, and most preferably at least 900 m$^2$/g, and an average pore size of at least 20 microns. Pore sizes above about 100 microns are not preferred.

The amount of active filter media (including activated carbon) used in the composite will vary with the size of the filter and its particular use. Typically, however, from about 40 to about 75 wt. %, preferably from about 45 to about 70 wt. %, active filter media (based on total weight of the composite) will be present in a composite used in a conventional automobile oil filter and based on typical oil filter charge intervals. However, additional active filter media would be required to extend the oil filter change interval while removing an equivalent amount of PNAs.

The polymer used should have the following characteristics:

be essentially oil insoluble, have a melting point below the temperature used to form the composite and above the operating temperature of the filter, and retain its structure during formation of the composite.

The amount of polymer (including nylon) used in the composite will vary with the hardness and density of the active filter media used to form the composite, with less polymer being required for active filter media of increased density. Typically, however, the amount of polymer will range from about 2 to about 25 wt. % and preferably from about 4 to about 14 wt. %, based on total weight of the composite.

In a preferred embodiment, the uniform feed mixture 38 should contain an oil basestock (or base oil) of proper viscosity and a metal stearate in addition to the active filter media and thermoplastic binder described above. This will facilitate the uniform feed mixture 38 entering the die 26 remaining flowable, thereby ensuring efficient production of the hollow solid composite used in the filter system of this invention. The base oil can be derived from natural lubricating oils, synthetic lubricating oils, or mixtures thereof. In general, the base oil should have a viscosity at 100° F. between about 75 and about 900 SSU. Preferably, the viscosity will be between about 150 and about 800 SSU, more preferably between about 500 and about 700 SSU. A solvent 600 neutral base oil is most preferred. The base oil (and hence, the composite) may also contain one or more additives of the type generally used in lubricating oils.

Natural base oils include animal oils, vegetable oils (e.g., castor oil and lard oil), petroleum oils, mineral oils, and oils derived from coal or shale.

Synthetic oils include hydrocarbon oils and halo-substituted hydrocarbon oils such as polymerized and interpolymerized olefins (e.g. polybutylenes, polypropylenes, propylene-isobutylene copolymers, chlorinated polybutylenes, poly(1-hexenes), poly(1-octenes), poly(1-decenes), etc., and mixtures thereof); alkylbenzenes (e.g. dodecylbenzenes, tetradecylbenzenes, dinonylbenzenes, di(2-ethylhexyl)benzene, etc.); polyphenyls (e.g. biphenyls, terphenyls, alkylated polyphenyls, etc.); alkylated diphenyl ethers, alkylated diphenyl sulfides, as well as their derivatives, analogs, and homologs thereof; and the like.

Synthetic base oils also include alkylene oxide polymers, interpolymers, copolymers and derivatives thereof wherein the terminal hydroxyl groups have been modified by esterification, etherification, etc. This class of synthetic oils is exemplified by polyoxyalkylene polymers prepared by polymerization of ethylene oxide or propylene oxide; the alkyl and aryl ethers of these polyoxyalkylene polymers (e.g., methyl-polyisopropylene glycol ether having an average molecular weight of 1000, diphenyl ether of polyethylene glycol having a molecular weight of 500–1000, diethyl ether of polypropylene glycol having a molecular weight of 1000–1500); and mono- and polycarboxylic esters thereof (e.g., the acetic acid esters, mixed $C_3$–$C_8$ fatty acid esters, and $C_{13}$ oxo acid diester of tetraethylene glycol).

Another suitable class of synthetic base oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, and the like.

Silicon-based oils (such as the polyakyl-, polyaryl-, polyalkoxy-, or polyaryloxy-siloxane oils and silicate oils) comprise another useful class of synthetic base oils. These oils include tetraethyl silicate, tetraisopropyl silicate, tetra-(2-ethylhexyl) silicate, tetra-(4-methyl-2-ethylhexyl) silicate, tetra(p-tert-butylphenyl) silicate, hexa-(4-methyl-2-pentoxy)-disiloxane, poly(methyl)-siloxanes and poly(methylphenyl) siloxanes, and the like. Other synthetic base oils include liquid esters of phosphorus-containing acids (e.g., tricresyl phosphate, trioctyl phosphate, diethyl ester of decylphosphonic acid), polymeric tetrahydrofurans, polyalphaolefins, and the like.

The base oil may be derived from unrefined, refined, rerefined oils, or mixtures thereof. Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Rerefined oils are obtained by treating refined oils in processes similar to those used to obtain the refined oils. These rerefined oils are also known as reclaimed or reprocessed oils and often are additionally processed by techniques for removal of spent additives and oil breakdown products.

The amount of base oil in the uniform mixture is not critical, but should range from about 15 to about 45 wt. %, preferably from about 20 to about 40 wt. %, based on total weight of the composite.

The uniform feed mixture 38 should also contain a small amount of a metal stearate to reduce friction as the mixture passes through the extrusion process. Suitable metal stearates include calcium stearate, sodium stearate, or mixtures thereof, with sodium stearate being particularly preferred. The amount of metal stearate in the uniform mixture is also not critical, but should range from about 0.5 to about 8 wt. %, preferably from about 1 to about 4 wt. %, based on total weight of the composite.

In a preferred embodiment, the filter system of this invention will also contain an inactive filter media. By "inactive filter media" is meant a filter media that is inert and does not interact with the lubricating oil except to remove particulates from the oil by physical filtration. Suitable inactive filter media may be found in today's conventional engine oil filters and include porous paper (e.g. pleated paper), glass fibers, spun polymer filament, and the like. The inactive filter media serves to retain and remove solid particles from the oil. Preferably, the composite and the inactive filter media will (but need not) be located within the same container. Most preferably, the composite will surround the inactive filter media such that the oil passes, in series, through the former before the latter. This arrangement is preferred to reduce pressure drop across the former.

However, the filter system could also comprise a two-stage filter in which loosely packed discrete particles of a chemically active filter media, the physically active filter media, or mixtures thereof are located in a separate cannister that is attached to a filter containing the hollow solid composite described above, alone or in combination with the inactive filter media.

Figure 5:
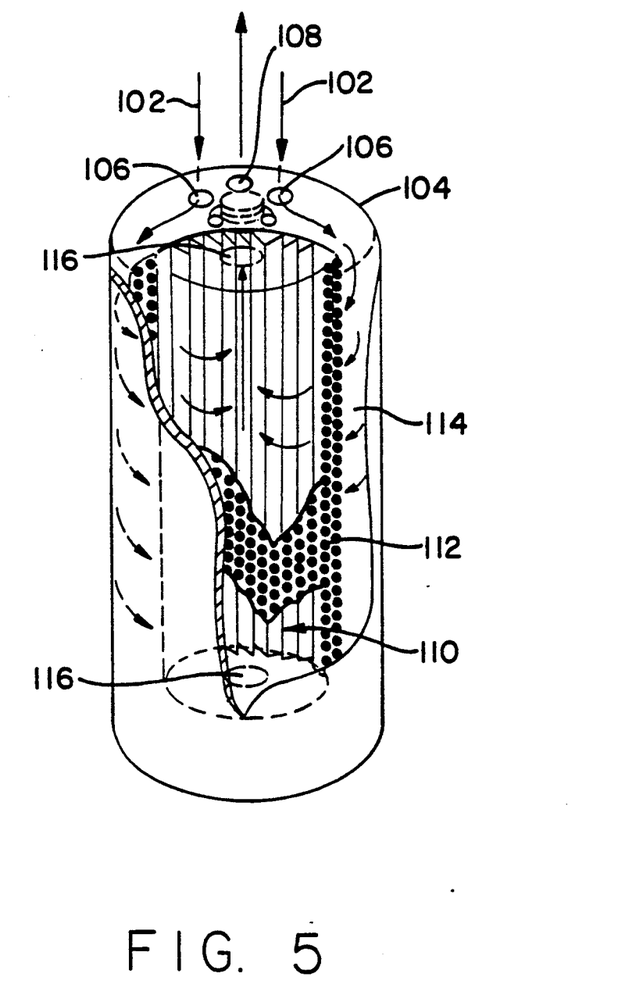
FIG. 5 is a diagram showing a preferred single-stage embodiment of the filter system of this invention.
Figure 6:
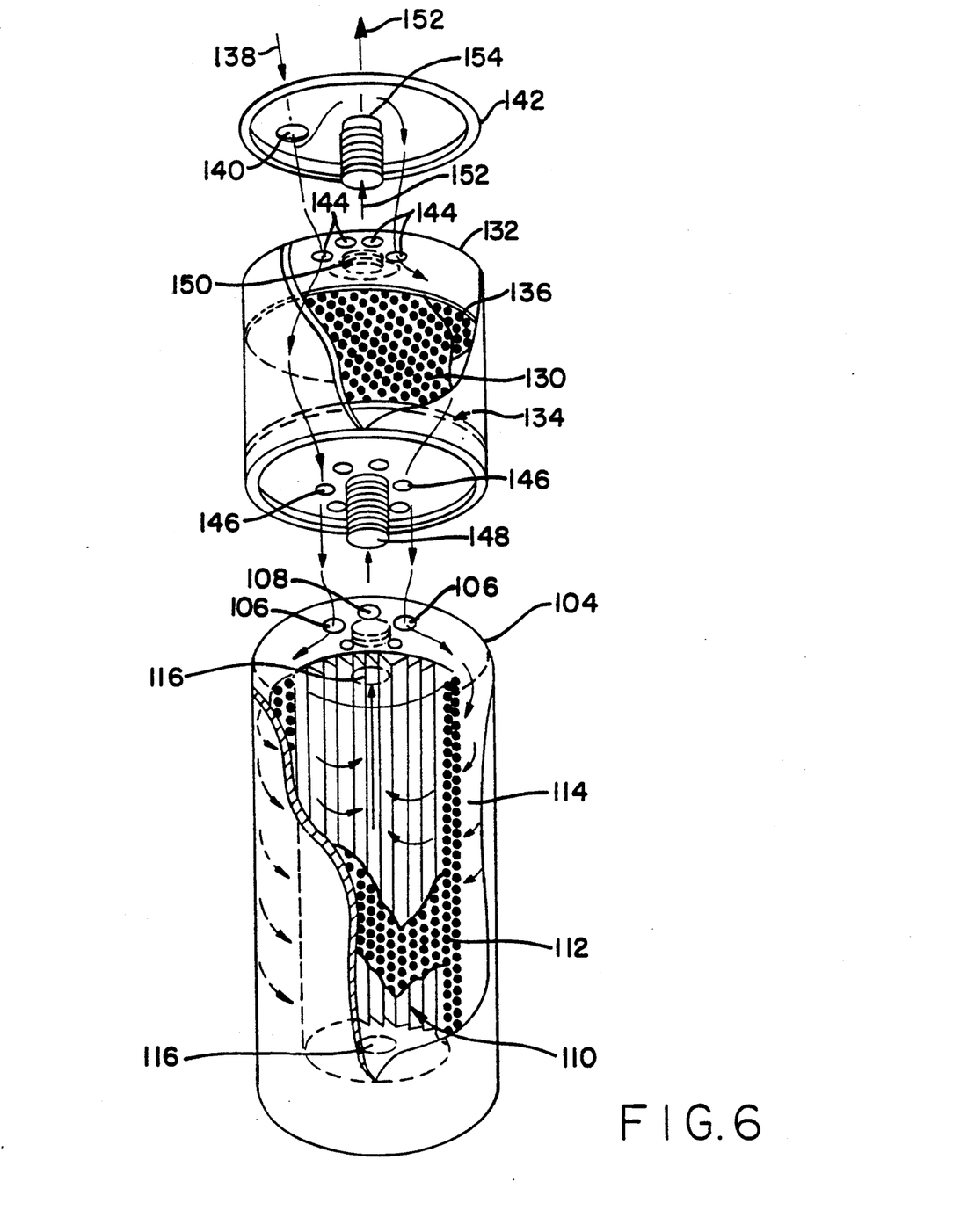
FIG. 6 is a diagram showing a possible two-stage embodiment of the filter system of this invention.

The filter system of this invention will be better understood by reference to the single-stage and two-stage embodiments shown in FIGS. 5 and 6, respectively.

FIG. 5 represents a preferred embodiment and depicts a modified conventional engine oil filter in which a used lubricating oil 102 is passed into a filter housing 104 having one or more used oil inlets 106 and a rejuvenated oil outlet 108. Within filter housing 104 is an inactive filter media 110 surrounded by and in contact with a filter media 112 which contains a chemically active filter media, a physically active filter media, or a mixture thereof, and which is in the form of a hollow solid cylinder or tube composite. The composite should have a compression strength of at least 8 pounds per square inch to minimize breakage. Filter media 112 and filter housing 104 are located such that an annular space 114 is formed between them.

Used oil 102 enters filter housing 104 through used oil inlets 106 and travels down the annular space 114. The used oil then passes, in series, through filter media 112, inactive filter media 110, and into a cylindrical space 116 that extends the length of filter housing 104. Cylindrical space 116 connects with rejuvenated oil outlet 108 and serves as a conduit for the rejuvenated oil to exit the filter system. In this embodiment, cylindrical space 116 is closed at the end opposite of rejuvenated oil outlet 108 so that the rejuvenated oil must exit through outlet 108.

One possible two-stage embodiment of this invention is shown in FIG. 6 wherein an active filter media 130 is contained within a cannister housing 132 (the first stage) that is separate from (but capable of being connected to) filter housing 104 (the second stage). Filter media 130 is a chemically active filter media, a physically filter media, or a mixture thereof in the form of separate discrete particles, not the composite described above. Filter media 130 is located within cannister housing 132 between support means 134 (e.g. a support grid) and a distribution means 136. As shown in FIG. 6, used lubricating oil 138 enters cannister housing 132 through an opening 140 which is located on the cover 142 of the cannister. After passing through used oil inlets 144, the oil contacts distribution means 136 which evenly distributes the oil over the surface of filter media 130. This promotes efficient contacting as the oil passes through filter media 130. Preferably, filter media 130 is in contact or close proximity with distribution means 136. The oil then passes through support means 134 and exits cannister housing 132 through cannister oil outlets 146, which are aligned with oil inlets 106 of filter housing 104 such that the oil flows directly into filter housing 104. After passing through filter housing 104 as described previously in FIG. 5, the rejuvenated oil exits filter housing 104 through outlet 108, which is aligned to a corresponding oil inlet 148 in cylindrical space 150 within the central core of cannister housing 132. The rejuvenated oil 152 passes through cylindrical space 148 and is returned to the engine via outlet 154.

There are many variations possible with the filter system of this invention. For example, filter media 130 may be supported on the same (or different) substrates as the composite of filter media 112. Similarly, the chemically active ingredients in filter media 130 and in filter media 112 may be the same or different. For example, filter media 130 could contain the same strong bases as could be present in filter media 112. However, filter media 120, but not filter media 112, could contain a chemically active ingredient capable of decomposing hydroperoxides present in the lubricating oil to form essentially harmless species that are oil soluble (see U.S. Pat. No. 4,997,546, the disclosure of which is incorporated herein by reference). The hydroperoxide decomposer should be insoluble or substantially insoluble in the oil. Suitable hydroperoxide decomposers include $MoS_2$, $Mo_4S_4(ROCS_2)_6$, and NaOH. $Mo_4S_4(ROCS_2)_6$ and NaOH are preferred, with NaOH being most preferred. As disclosed in U.S. Pat. No. 4,997,546, $Mo_4S_4(ROCS_2)_6$ is formed by reacting molybdenum hexacarbonyl $(Mo(CO)_6)$ with a dixanthogen $[(ROCS_2)_2]$. The reaction is conducted at temperatures ranging from about ambient conditions (e.g., room temperature) to about 140° C., especially between about 80° to about 120° C., for from about 2 to about 10 hours. For example, the $Mo(CO)_6$ and the dixanthogen may be refluxed in toluene for times ranging from about 2 to about 8 hours. The reaction time and temperature will depend upon the dixanthogen selected and the solvent used in the reaction. However, the reaction should be conducted for a period of time sufficient to form the compound. Solvents that are useful in the reaction include aromatic hydrocarbons, especially toluene.

Dixanthogens which are especially useful can be represented by the formula $(ROCS_2)_2$ in which R can be the same or different organo groups selected from alkyl, aralkyl, and alkoxyalkyl groups having a sufficient number of carbon atoms such that the compound formed is soluble in a lubricating oil. Preferably R will have from 2 to 20 carbon atoms. More preferably, R will be an alkyl group having from 2 to 20 carbon atoms, especially from 4 to 12 carbon atoms.

In forming $Mo_4S_4(ROCS_2)_6$, the mole ratio of dixanthogen to molybdenum hexacarbonyl should be greater than about 1.5 to 1.0. For example, in preparing this compound, mole ratios of $(ROCS_2)_2$ to $Mo(CO)_6$ in the range of from about 1.6:1 to about 2:1 are preferred.

Depending primarily upon the time and temperature at which the $Mo(CO)_6$ and $(ROCS_2)_2$ are reacted, the molybdenum and sulfur containing additive that forms is a brown compound, a purple compound, or a mixture of both. Shorter reaction times (e.g., four hours or less) favor the formation of the purple compound. Longer reaction times (e.g., four hours or more) favor formation of the brown compound. For example, when $(C_8H_{17}OCS_2)_2$ is reacted with $Mo(CO)_6$ in toluene for four hours at 100° to 110° C., most of the starting material is converted to the purple compound, with virtually none of the brown compound being present. However, continued heating of the reaction mixture results in conversion of the purple compound to the brown compound. Indeed, after about six or seven hours, the purple form is largely converted to the brown form.

In general, the $Mo(CO)_6$ and dixanthogen are contacted for a period of time sufficient for reaction to occur, but typically less than about 7 hours. Beyond 7 hours, undesirable solids begin to form. To maximize the formation of the compound and minimize the formation of undesirably solid by-products, the $Mo(CO)_6$ should be reacted with the dixanthogen at temperatures of about 100° to about 120° C. for times ranging from about five to six hours, thereby producing reaction mixtures which contain both the brown and purple forms of the compounds. This is not a disadvantage because both forms are effective additives, and mixtures of the two species (brown and purple) perform as well as either species alone.

The compounds formed with R groups between about $C_4H_9$ and about $C_{14}H_{29}$ can be readily separated from oily organic by-products of the reaction by extracting the oily by-products with moderately polar solvents such as acetone, ethyl alcohol, or isopropyl alcohol. The compounds with these R groups are substantially insoluble in such solvents, while the oily by-products are soluble. Separation of the compounds from the by-products, however, is not necessary because the by-products do not detract from the beneficial functional properties of the compounds.

The physical properties of the purple and brown forms vary with the R group. For example, the compound is a crystalline solid when R is $C_2H_5$ and an amorphous solid when R is larger than about $C_7H_{15}$.

The purple compound formed in reacting $Mo(CO_6)$ with $(ROCS_2)_2$ is a thiocubane of the formula $Mo_4S_4(ROCS_2)_6$.

The brown compound formed in reacting $Mo(CO_6)$ with $(ROCS_2)_2$ is also believed to have a structure very similar to the thiocubane structure of the purple compound based on its ease of formation from the purple compound and chemical analysis.

Another example of a chemically active ingredient that may be present in filter media 130 but not the composite of filter media 112 is disclosed in copending application U.S. Ser. No. 404,040, filed Sep. 7, 1989, now U.S. Pat. No. 5,042,617 (the disclosure of which is incorporated herein by reference) in which the filter media 30 would contain a dispersant functional group that is insoluble or substantially insoluble in the oil. By "dispersant functional group" is meant that portion of a conventional lubricating oil dispersant that complexes or reacts with sludge and varnish precursors in the oil (the other portion of a conventional dispersant is a solubilizing group such as polyisobutylene). Examples of suitable dispersant functional groups include amines, polyamines, morpholines, oxazolines, piperazines, alcohols, polyols, polyethers, or substituted versions thereof (e.g., alkyl, dialkyl, aryl, alkaryl, or aralkyl amines, etc.). When the sludge in the oil contacts the dispersant functional group on the filter media, the sludge complexes with the dispersant functional group and is removed from the oil as a deposit on the filter media.

Thus, the two-stage filter system shown in FIG. 6 can also be modified to treat used lubricating oil using a series of chemically active or physically active filter media that have been tailored to perform a specific function on the oil. For example, chemically active filter media 130 in cannister housing 132 may be subdivided into three chemically active filter media, each of which contains a different chemically active ingredient tailored to perform a specific function. The three subdivided filter media comprising filter media 130 may be separated from one another by partition means (not shown). If the first subdivided filter media were to contain a strong base, the second a hydroperoxide decomposer, and the third a dispersant function group, then acids in the oil passing through filter media 130 would first be neutralized by the strong base in the first subdivided filter media, with the acid salts thus formed being immobilized as deposits on the filter media. The strong base could also immobilize any soot that might be present in the oil. The oil would then pass through a first partition means into the second subdivided filter media where hydroperoxides in the oil would be decomposed to harmless oil soluble products. The oil would then pass through a second partition means into the third subdivided filter media where sludge in the oil would complex with the dispersant functional group such that the sludge becomes immobilized on this filter media. Finally, the partially treated oil could pass from cannister housing 132 into filter housing 104 where PNAs in the oil would be removed by contacting a physically active filter media 112 in the form of a composite of activated carbon and a polymer. The rejuvenated oil would then be ready for reuse.

Using a cannister containing separate compartments of different chemically active filter media described above has several advantages over conventional oil filters in rejuvenating used oil:

The dispersant functional group is more effective in removing sludge if the basicity/acidity of the oil has been adjusted in the first compartment of the cannister filter.

Inactive filter media 110 can be used for a longer period of time if sludge is removed from the oil by a filter media in cannister housing 132 rather than being permitted to accumulate on inactive filter media 110.

If concentric compartments containing different filter media were used in a conventional single stage filter, the total diameter of the resulting filter would be large enough to make it virtually unusable in the confined underhood space of modern automotive vehicles.

Since the inactive filter media is designed to have a large surface area to avoid becoming plugged by particulates in the oil, any active filter media surrounding the inactive filter media would have a thin (or narrow) bed depth to accommodate current filter designs. However, a thin bed would limit the effectiveness of the active filter media because a deeper bed depth is more effective for chemical and physical interactions than a shallow bed depth. Accordingly, although the cannister design has a relatively small cross-sectional area, it has a thicker bed depth such that a more effective oil treatment can be obtained for the same amount of active filter media. This arrangement is particularly preferred when the active media has a longer lifetime than the oil or the inactive filter media (i.e., the cannister containing the active media may not have to be changed with the oil or conventional filter).

Thus, the two-stage design is flexible and offers an economical solution to a variety of filter needs.

The filter system of this invention can be used to rejuvenate lubricating oils from the lubrication system of essentially any internal combustion engine, including automobile and truck engines, two-cycle engines, aviation piston engines, marine and railroad engines, gas-fired engines, alcohol (e.g. methanol) powered engines, stationary powered engines, turbines, and the like. However, this filter system can also be suitably applied to essentially any oil (e.g., industrial lubricating oils) whose chemical or physical properties can be improved. Such lubricating oils can be derived from natural basestocks, synthetic basestocks, or mixtures thereof, and may contain one or more additives (e.g. antiwear agents, VI improvers, pour point depressants, and the like). Although not necessary, it is preferred that the filter system be located within the lubrication system of an internal combustion engine.

This invention is applicable to a variety of filter system designs. As such, although the filter systems in FIGS. 5 and 6 have been described for a cylindrical design, no specific structural design of the filter is necessary.

This invention may be further understood by reference to the following examples which are not intended to restrict the appended claims.

EXAMPLE 1

Preparation of Hollow Solid Composite From Calgon Activated Carbon

A mixture 11 wt. % -60 mesh Nylon 11 particles (available from Atochem North America), 59 wt. % APC granular activated carbon 12×40 mesh particles having a density (packed) of 0.34 g/cm$^3$ (available from Calgon Carbon Corporation), 28 wt. % solvent 600 neutral base oil, and 2 wt. % sodium stearate was intensively mixed in a plow mixer for about 30 minutes until a substantially uniform feed mixture was obtained. The mixture was then fed into an extruder. The auger style extruder screw, 2.8" OD, 2.0" root, was rotated at 3 rpm. The extruder barrel was maintained at ambient room temperature, about 20° C., while the single heat zone of the die was maintained at 500° F. (260° C.) and the cooling zone at 95° F. (44° C.). The die was a 4140 stainless steel die 2.8" OD, 9" overall length, the heating zone being 6" and the cooling zone 3". The extruder screw was equipped with a 2.0" diameter, smooth, 4140 stainless steel center rod screwed into the tip of the screw and extending through the center of the die so that a 2.8" OD, 2.0 ID cylindrical filter element is extruded. A doughnut type back pressure device was employed to provide sufficient back pressure (about 10 psi) to consolidate the feed mixture into a hollow solid composite filter element without crushing the carbon particles. The composite produced had a density of about 0.68 gm/cm³.

EXAMPLE 2
Preparation of Hollow Solid Composite From Norit Activated Carbon

Following the procedure of Example 1, a substantially uniform feed mixture was prepared from 60 g of Norit RO 0.8 pelletized activated carbon having a pellet diameter of 0.8 millimeters and a density (packed) of 0.38 g/cm³ (available from American Norit Company, Inc.), 6.7 g Nylon 11 polymer, 31.2 g solvent 600 neutral base oil, and 2 g sodium stearate. The mixture was then extruded as in Example 1 except that the apparatus was modified such that the composite produced had a density of 0.60 g/cm³, an OD of 3.425", and an ID of 2.71".

EXAMPLE 3
Removal of Polynuclear Aromatics

Several computer controlled mileage accumulation dynamometer tests were performed on two Ford Escorts equipped with various oil filter devices. The devices tested are as follows:

a standard automobile filter containing only pleated filter paper, a standard automobile filter containing particles of the Calgon APC activated carbon used in Example 1 loosely surrounding pleated filter paper in a conventional oil filter.

a composite of activated carbon particles and a thermoplastic binder formed by the methods described in Examples 1 and 2. In some tests, pleated filter paper was not included.

The same fuel (89 average RON and MON, unleaded) and lubricating oil (commercially available SAE 10W30 Superflo meeting API SG specifications) were used in each test. Each test cycle lasted 15,000 km. The results of these tests are shown in Table 1.

TABLE 1

| Filter Type | Polymer Type | Polymer (1) wt. % | PNA (2) ppm | lbs oil | PNA (3) ppm | % PNA Reduction |
| --- | --- | --- | --- | --- | --- | --- |
| Standard (4) | — | — | 555 | 9.7 | 566 | 0 |
| Calgon APC Activated Carbon | | | | | | |
| Loose Pack (5) | — | — | 669 | 8.4 | 590 | 1 |
| Loose Pack (5) | — | — | 934 | 9.3 | 912 | 0 |
| Loose Pack (5) | — | — | 591 | 8.1 | 503 | 12 |
| Composite (6) | Polyethylene/ polysulfone | 6.5/16 | 110 | 13.4 | 152 | 78 |
| Composite (7) | Nylon 11 | 9 | 86 | 9.0 | 80 | 87 |
| Composite (8) | Nylon 11 | 11 | 97 | 7.3 | 76 | 92 |
| Composite (8) | Nylon 11 | 11 | 64 | 9.0 | 61 | 93 |
| Composite (8) | Nylon 11 | 11 | 59 | 13.5 | 86 | 88 |
| Composite (8) | Nylon 11 | 11 | 62 | 8.3 | 54 | 91 |
| Composite (9) | Nylon 11 | 11 | 117 | 12.8 | 157 | 73 |
| Composite (10) | Nylon 11 | 12.5 | 153 | 11.8 | 190 | 66 |
| Norit RO 0.8 Activated Carbon | | | | | | |
| Composite (11) | Nylon 11 | 5.4 | 79 | 9.2 | 76 | 87 |
| Composite (11) | Nylon 11 | 5.4 | 110 | 9.1 | 105 | 81 |
| Composite (12) | Nylon 11 | 6.7 | 78 | 9.1 | 74 | 87 |

(1) Based on total weight of the composite.
(2) In used oil at end of dynamometer test.
(3) Corrected to same amount of oil by normalizing each test to 9.516 lbs of oil on test (initial fill and oil added during test).
(4) An average of eight tests.
(5) An average of two tests in which 60 g of APC activated carbon particles loosely surrounded the pleated filter paper in a conventional oil filter.
(6) Composite weighed 120 g and contained 60 g APC activated carbon, 7.8 g polyethylene, 19.2 g polysulfone, 30.6 g base oil, and 2.4 g sodium stearate. Filter did not include inactive filter media.
(7) Composite weighted 120 g and contained 75 g APC activated carbon, 10.8 g Nylon 11, 31.8 g base oil, and 2.4 g sodium strearate. Filter did not included inactive filter media.
(8) Composite weighed 123 g and contained 73.2 g APC activated carbon, 13.2 wt. % Nylon 11, 34.2 g base oil, and 2.4 g sodium stearate. Filter did not include inactive filter media.
(9) Same composite as in (8) but filter included inactive filter media (pleated paper).
(10) Composite weighed 120 g and contained 68.7 g APC activated carbon, 14.7 g Nylon 11, 34.2 g base oil, and 2.4 g sodium stearate. Filter did not include inactive filter media.
(11) Composite weighed 100 g and contained 61.3 g Norit RO 0.8 activated carbon, 5.4 g Nylon 11, 31.3 g base oil, and 2 g sodium stearate. Filter did not include inactive filter media.
(12) Composite weighed 100 g and contained 60 g Norit RO 0.8 activated carbon, 6.7 g Nylon 11, 31.3 g base oil, and 2 g sodium stearate. Filter did not include inactive filter media.

The data in Table 1 show that an oil filter containing a hollow activated carbon composite (with and without an inactive filter media) is significantly more effective in removing PNAs from a used lubricating oil than the PNA removal obtained using a conventional oil filter (without activated carbon) or a conventional oil filter containing loosely packed particles of activated carbon. The data also show that less polymer is required to form a composite when a higher density activated carbon is used.

What is claimed is:

1. A method for removing polynuclear aromatics from a used lubricating oil which comprises passing the lubricating oil through a filter system containing a hollow solid composite comprising a thermoplastic binder and activated carbon, wherein the composite is formed by the steps comprising
   (a) providing a quantity of the thermoplastic binder in the form of particles having diameters between about 0.1 and about 250 micrometers;
   (b) providing a quantity of activated carbon having a softening temperature substantially greater than the softening temperature of the thermoplastic binder, the activated carbon being in the form of particles having diameters between about 0.1 and about 3,000 micrometers;
   (c) combining the particles from (a) and (b) to form a substantially uniform mixture wherein from about 2 to about 25 wt. % of the thermoplastic binder and about 40 to about 75 wt. % of the activated carbon are present in the mixture;
   (d) extruding the substantially uniform mixture of (c) into a die;
   (e) heating the substantially uniform mixture from (d) to a temperature substantially above the softening temperature of the thermoplastic binder but to a temperature less than the softening temperature of the activated carbon;
   (f) applying sufficient back pressure, from outside the die, to the heated mixture from (e) within the die to convert the heated mixture into a substantially homogeneous composite;
   (g) rapidly cooling the composite from (f) to a temperature below the softening point of the thermoplastic binder to produce a cooled composite; and
   (h) extruding the cooled composite from the die as an extruded hollow solid composite.

2. The method of claim 1 wherein the back pressure applied to the heated mixture in (f) is between about 5 to about 400 psi.

3. The method of claim 2 wherein the substantially uniform mixture in (e) is heated to a temperature of at least about 25° C. above the softening temperature of the thermoplastic binder.

4. The method of claim 3 wherein the die in (d) is of substantially uniform cross-section.

5. The method of claim 1 wherein the substantially uniform mixture in (c) also contains from about 15 to about 45 wt. % of a base oil having a viscosity between about 75 and about 900 SSU at 100° F. and from about 0.5 to about 8 wt. % of a metal stearate.

6. The method of claim 5 wherein the substantially uniform mixture in (c) comprises:
   (a) from about 45 to about 70 wt. % activated carbon;
   (b) from about 4 to about 14 wt. % thermoplastic binder particles; and
   (c) from about 20 to about 40 wt. % base oil;
   (d) from about 1 to about 4 wt. % of a metal stearate;
   wherein the activated carbon has a softening temperature of at least about 25° C. above the softening temperature of the thermoplastic binder particles.

7. The method of claim 1 wherein the filter system is within the lubrication system of an internal combustion engine.

8. The method of claim 1 wherein the lubricating oil is passed, in series, through a filter system comprising a first filter housing that contains discrete particles of an active filter media that is a chemically active filter media, a physically active filter media, or a mixture thereof, and then through a second filter housing that contains a hollow solid composite comprising a thermoplastic binder and activated carbon.

9. The method of claim 1 wherein the filter system also contains an inactive filter media.

10. The method of claim 1 wherein the thermoplastic binder is nylon.

11. A method for removing polynuclear aromatics from a used lubricating oil which comprises passing the lubricating oil through a filter system that contains (1) a hollow solid composite comprising from about 2 to 25 wt. % of nylon particles and from about 40 to about 75 wt. % of activated carbon particles, and (2) an inactive filter media, wherein the composite in (1) is formed by the steps comprising
   (a) combining the nylon and activated carbon particles with from about 15 to about 45 wt. % of a base oil having a viscosity between 75 SSU and about 900 SSU at 100° F. and from about 0.5 to about 8 wt. % of a metal stearate to form a substantially uniform mixture;
   (b) extruding the substantially uniform mixture of (a) into a die;
   (c) heating the substantially uniform mixture from (b) to a temperature substantially above the softening temperature of the nylon but to a temperature less than the softening temperature of the activated carbon;
   (d) applying sufficient back pressure, from outside the die, to the heated mixture from (c) within the die to convert the heated mixture into a substantially homogeneous composite;
   (e) rapidly cooling the composite from (d) to a temperature below the softening point of the nylon to produce a cooled composite; and
   (f) extruding the cooled composite from (e) from the die as an extruded hollow solid composite.

12. The method of claim 11 wherein the back pressure applied to the heated mixture in (d) is between about 5 to about 400 psi.

13. The method of claim 12 wherein the substantially uniform mixture in (c) is heated to a temperature of at least about 25° C. above the softening temperature of the nylon.

14. The method of claim 13 wherein the die in (b) is of substantially uniform cross-section.

15. The method of claim 11 wherein the lubricating oil is passed, in series, through a filter system comprising a first filter housing that contains discrete particles of an active filter media that is a chemically active filter media, a physically active filter media, or a mixture thereof, and then through a second filter housing that contains a hollow solid composite comprising nylon particles and activated carbon particles.

16. The method of claim 11 wherein the filter system is within the lubrication system of an internal combustion engine.

* * * * *